United States Patent [19]
Wanek et al.

[11] 3,953,890
[45] Apr. 27, 1976

[54] INFORMATION RETRIEVAL MACHINE WHICH USES A CASSETTE FOR HOLDING TAPE CARTRIDGES

[75] Inventors: Donald John Wanek; Gordon Wilbur Westphal, both of Rochester, Minn.

[73] Assignee: International Business Machines Corporation, Armonk, N.Y.

[22] Filed: Mar. 24, 1975

[21] Appl. No.: 561,453

[52] U.S. Cl. .................................. 360/85; 360/92; 360/96; 360/132
[51] Int. Cl.² ................... G11B 5/52; G11B 15/66; G11B 23/04
[58] Field of Search ...................... 360/85, 91–93, 360/96, 132, 134; 242/55, 19 A, 194, 197–200, 180–181; 352/6

[56] References Cited
UNITED STATES PATENTS

| | | | |
|---|---|---|---|
| 3,525,086 | 8/1970 | Lichowsky | 360/85 |
| 3,604,713 | 9/1971 | Karnopp | 360/92 |
| 3,682,480 | 8/1972 | Ban | 360/92 |
| 3,810,239 | 5/1974 | Kozu et al. | 360/92 |

Primary Examiner—Alfred H. Eddleman
Attorney, Agent, or Firm—Keith T. Bleuer

[57] ABSTRACT

A machine for writing information on and reading information from a relatively wide magnetic tape including a carousel for receiving a plurality of cartridges holding such tape with the cartridges being disposed with their axes parallel with the axis of rotation of the carousel, a plunger for latching onto a cartridge in the carousel and moving the cartridge out of the carousel into a tape unwinding position, motor mechanism for unwinding the tape in this position and moving it across a bed carrying a rotatable magneitc read/write disk substantially coextensive with the face of the bed on which the tape travels, a takeup spool for receiving the tape passing across the bed and including a swingable arm for causing the tape to start winding on the spool, and a relatively slowly moving mandrel and a pressure roll cooperating with the mandrel for subsequently moving the tape across the bed so that the disk may have a magnetic reading or writing action with respect to the tape.

10 Claims, 14 Drawing Figures

INFORMATION RETRIEVAL MACHINE WHICH USES A CASSETTE FOR HOLDING TAPE CARTRIDGES

BACKGROUND OF THE INVENTION

The invention relates to information retrieval machines and more particularly to machines for magnetically reading and writing information on a magnetic tape.

Machines for magnetically acting on the tape held in individual cartridges or cassettes which are held by and are selectively moved out of a rotating carousel have previously been proposed. The tape used in such machines is of the relatively narrow variety, and the tape is held in the carousel with the axes of the tape spools in the cassette extending at angles to the axis of the carousel. Such machines are, for example, disclosed in the U.S. Pat. to Foelkel No. 3,617,066 and the U.S. Pat. to Raine No. 3,484,055. A similar mechanism for bringing any one of a series of motion picture film cassettes to a position wherein the film of the cassette passes through an operative position is disclosed in Kremp et al. U.S. Pat. No. 3,702,727.

Summary of the Invention

It is an object of the present invention to provide an improved machine for magnetically writing and reading information on a magnetic tape which is particularly suitable for use with relatively wide magnetic tapes such as tapes, for example, having a greater width than 2½ inches. In this connection, it is an object of the invention to provide a carousel for receiving such tapes rolled on a spool of a tape catridge, with the spool and rolled up tapes having their axes extending parallel with the axis of rotation of the carousel, and mechanism for ejecting the cartridges from the carousel for a subsequent reading and writing action and for pulling the cartridges back into the carousel after the reading and writing actions are complete.

In a preferred embodiment, the machine of the invention comprises a pair of opposite spindles for receiving such a carousel and allowing it to rotate, a plurality of tape cartridges received in cavities in the carousel, a plunger moveable into each of the cavities as the cavity is positioned in alignment with the plunger for making a mechanical connection with the cartridge and moving the cartridge axially out of the carousel onto a drive shaft, mechanism for driving the latter shaft for partially unrolling the tape and moving its leading end onto a tape carrying bed, a read/write disk having read and write transducers in substantial alignment with the surface of the bed carrying the tape, a takeup roll for receiving the leading end of the tape, a rotatable arm for cinching the tape onto the takeup roll, motor means for driving the takeup roll and means including a nipped mandrel and pressure roll and motor means for driving the mandrel for moving the tape at a controlled speed off of the cartridge and onto the takeup spool during which time the read/write head may be effective in writing information on or reading information from the tape.

DESCRIPTION OF THE PREFERRED EMBODIMENTS

Figure 1:
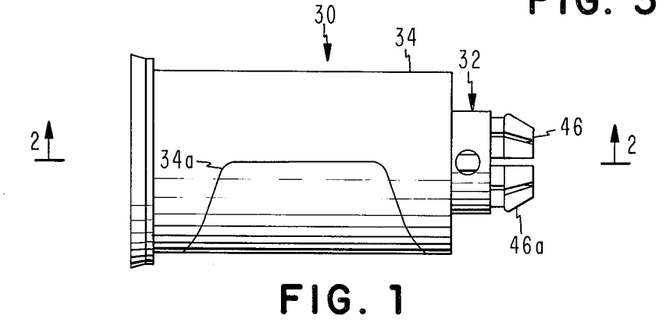
FIG. 1 is a side elevational view of a magnetic tape cartridge useable in the tape cartridge loading machine of the invention and which includes a central spool on which magnetic tape is wound.
Figure 2:
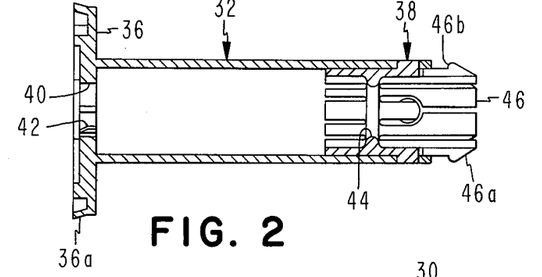
FIG. 2 is a sectional view taken on line 2—2 of FIG. 1 showing just the spool of the cartridge.
Figure 3:
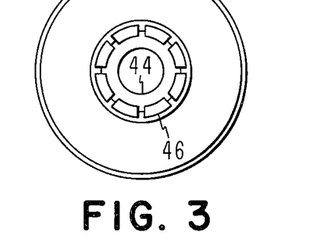
FIG. 3 is an end view of the spool shown in FIG. 2.

The tape cartridge loading machine of the invention utilizes a plurality of tape cartridges 30 as illustrated in FIGS. 1, 2 and 3. A tape cartridge 30 comprises a spool 32 and a length of magnetic tape 34 wound on the spool 32. The tape 34 has a relatively narrow end 34a.

The spool 32 is generally cylindrical and has a flange 36 on one end and an insert 38 within it at its other end. The end flange 36 has a central opening 40 through it, and relatively pointed teeth 42 are provided within the opening 40. The flange 36 is provided with an outwardly flaring portion 36a on its external periphery.

The insert 38 is formed with an inwardly extending rib 44 and is slitted on its end to have a series of teeth 46. The teeth 46 have tapered ends 46a and are undercut so as to provide radially extending surfaces 46b.

Figure 4:
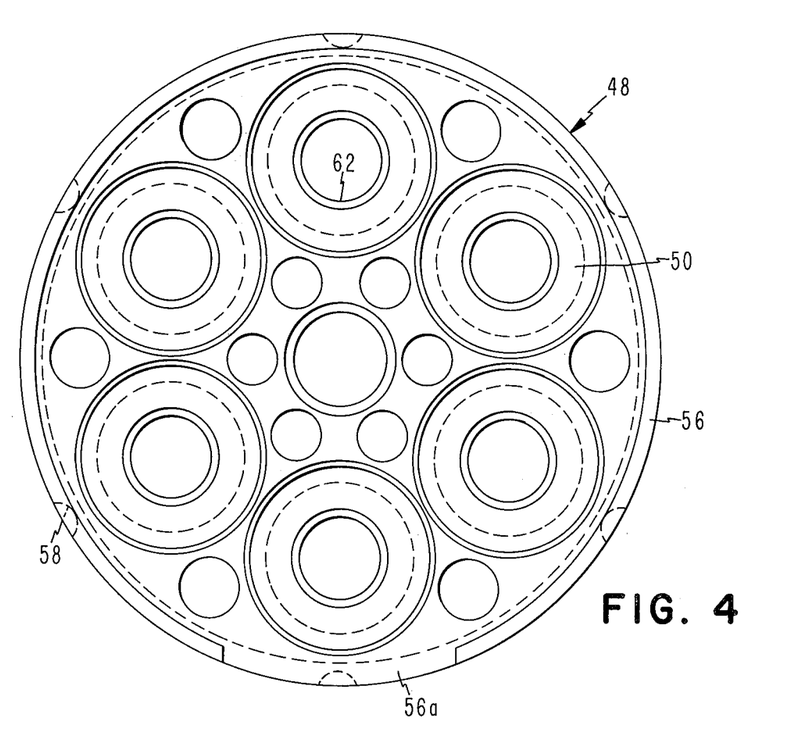
FIG. 4 is an end elevation view of a cartridge receiving cassette or carousel useable in the machine.

Six of the cartridges 30 are received and held by a cassette 48 in the form of a carousel. The carousel 48 is provided with six cavities 50 therein each of which has an outwardly flaring surface 50a on its open end. A cartridge 30 is normally disposed in each of the cavities 50 with the outwardly flaring surfaces 36a on the cartridge 30 in contact with the outwardly flaring surface 50a (see FIG. 6) of the cassette. The carousel 48 is provided with two tapered walled recesses 52 and 54 on the axis of rotation of the cassette and has on one end an axially extending flange 56 with an interruption or slot 56a (see FIG. 4) therein. Notches 58 are provided in the exterior surface of the cassette 48, and there is a notch 58 for each of the cavities 50.

Each of the cavities 50 is defined on its bottom by means of a return bent portion 60 (see FIG. 6), and a radially extending flange 62 is formed on the return bent portion 60. A washer 64 of soft yieldable material is disposed and fixed on the return bent portion 60 of each of the cavities 50.

Figure 5:
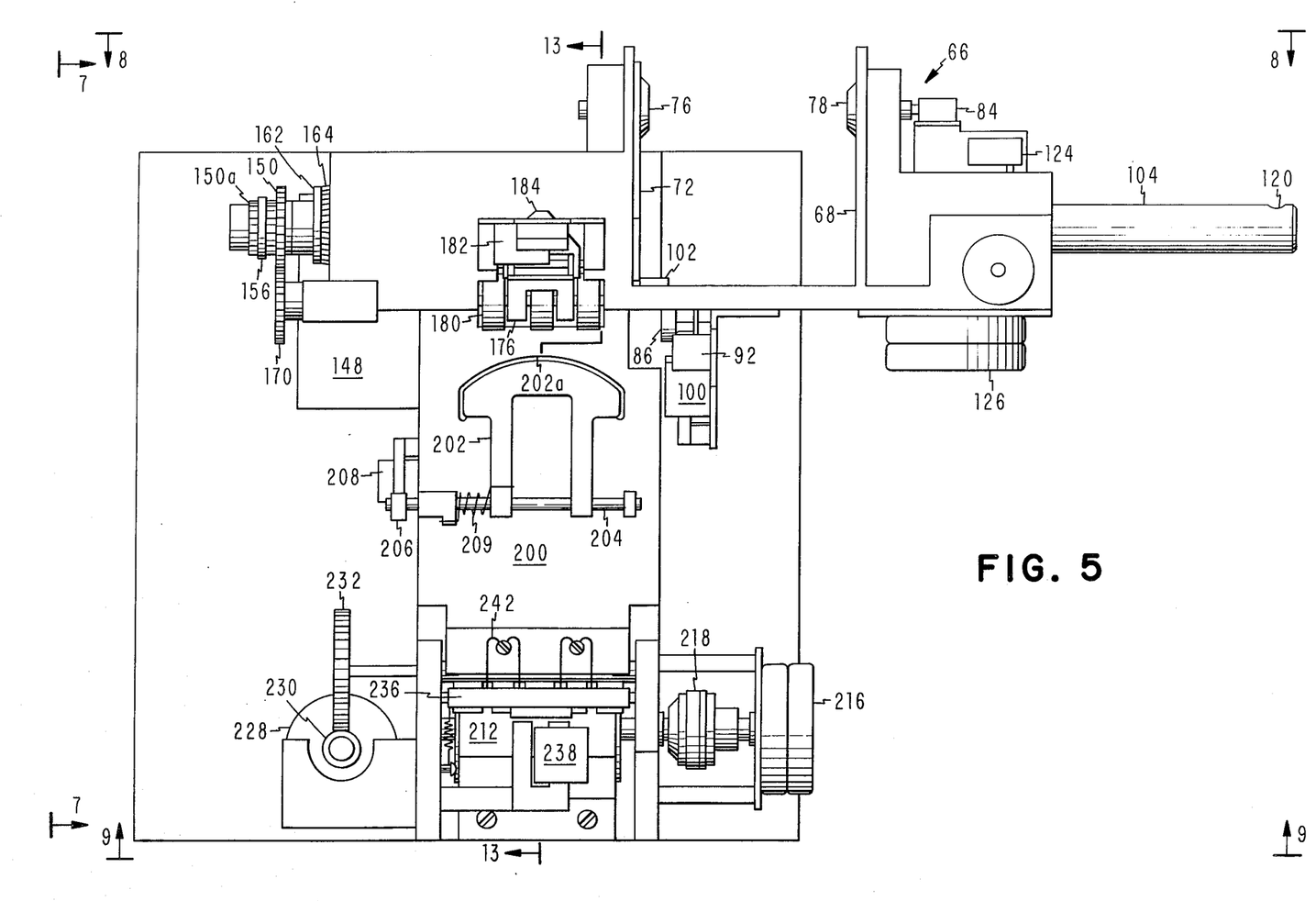
FIG. 5 is a plan view of the tape cartridge loading machine of the invention.

The tape cartridge loading machine 66 for using the carousel 48 loaded with cartridges 30 is provided with a cavity 68 for receiving the loaded cassette 48 (see FIG. 5). A tapered key 72 is provided in the cavity 68, and the cassette 48 is moved into the cavity 68 with the key 72 moving through the slot 56a of the flange 56 on the cassette 48 so that the cassette 48 can be positioned in only one position within the cavity 68. The end 74 of the key 72 overlies the flange 56 in rotary positions of the cassette 48 other than that in which it is inserted into the cavity 68.

The machine 66 carries a pair of opposite tapered plungers 76 and 78, and springs 80 and 82 are provided to act on the plungers 76 and 78. The plungers 76 and 78 fit within the recesses 52 and 54 in the cassette 48 and hold the cassette 48 in proper position within the cavity 68. The machine carries a switch 84 positioned to be actuated by the plunger 78 for indicating when the cassette 48 is in proper position within the machine cavity 68.

Figure 10:
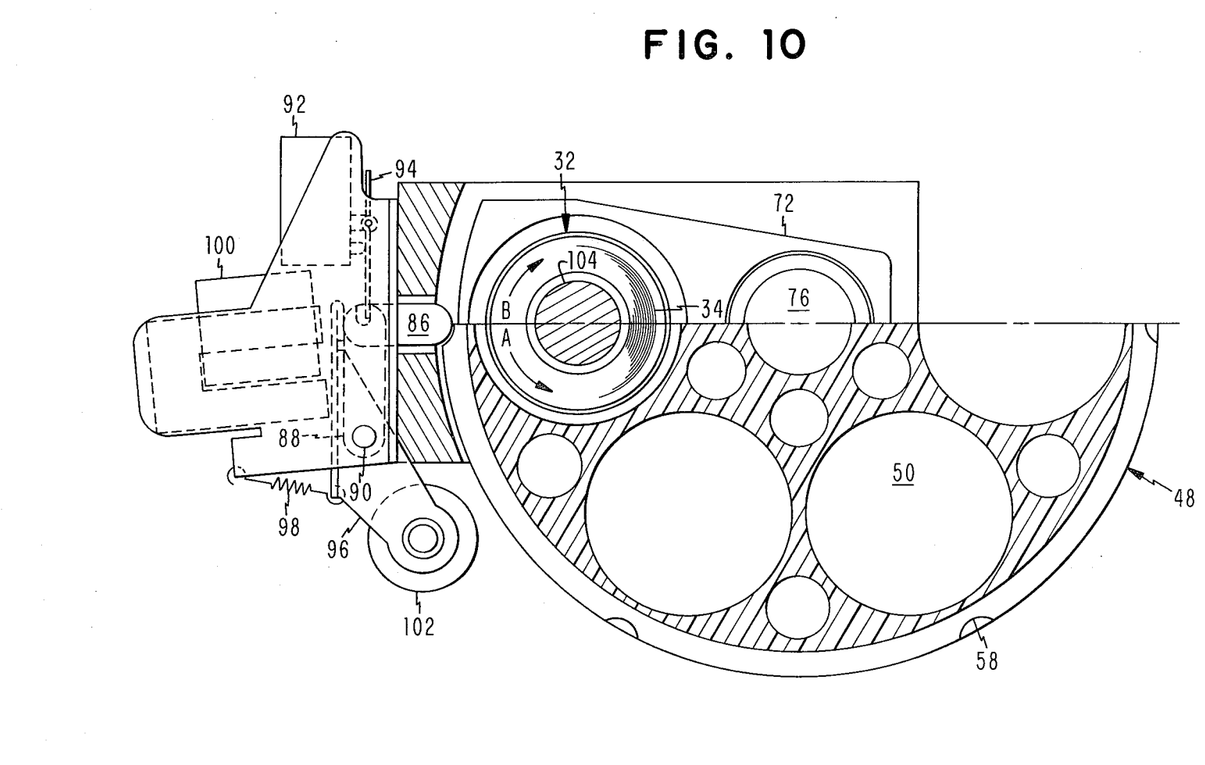
FIG. 10 is a sectional view on an enlarged scale taken on line 10—10 of FIG. 6 and with the carousel being removed from the machine.

A rounded locking member 86 (see FIGS. 6 and 10) is moveable into any of the notches 58. The locking member 86 is an integral part of a lever 88 that pivots about a shaft 90. A switch 92 is positioned opposite the locking member 86 and has an actuating arm 94 that extends into a notch provided in the end of the arm 88. The switch 92 has a built-in spring moving the actuating arm 94 counterclockwise as seen in FIG. 10, and this has the effect of moving the locking member 86 into one of the notches 58. The locking member 86 is moved out of the notch 58 due to the rounded cross section of the notch 58 when the cassette 48 is rotatably driven.

The arm 88 is acted on by a lever 96 which is also swingably mounted on the shaft 90. The lever 96 is acted on by a spring 98 and also by an electromagnet 100. The lever 96 carries a driver roller 102 on its end which is adapted to swing through an opening into driving engagement with an outer peripheral surface of the cassette 48 when the electromagnet 100 is energized. The roller 102 is rotatably driven as will be subsequently described.

Figure 6:
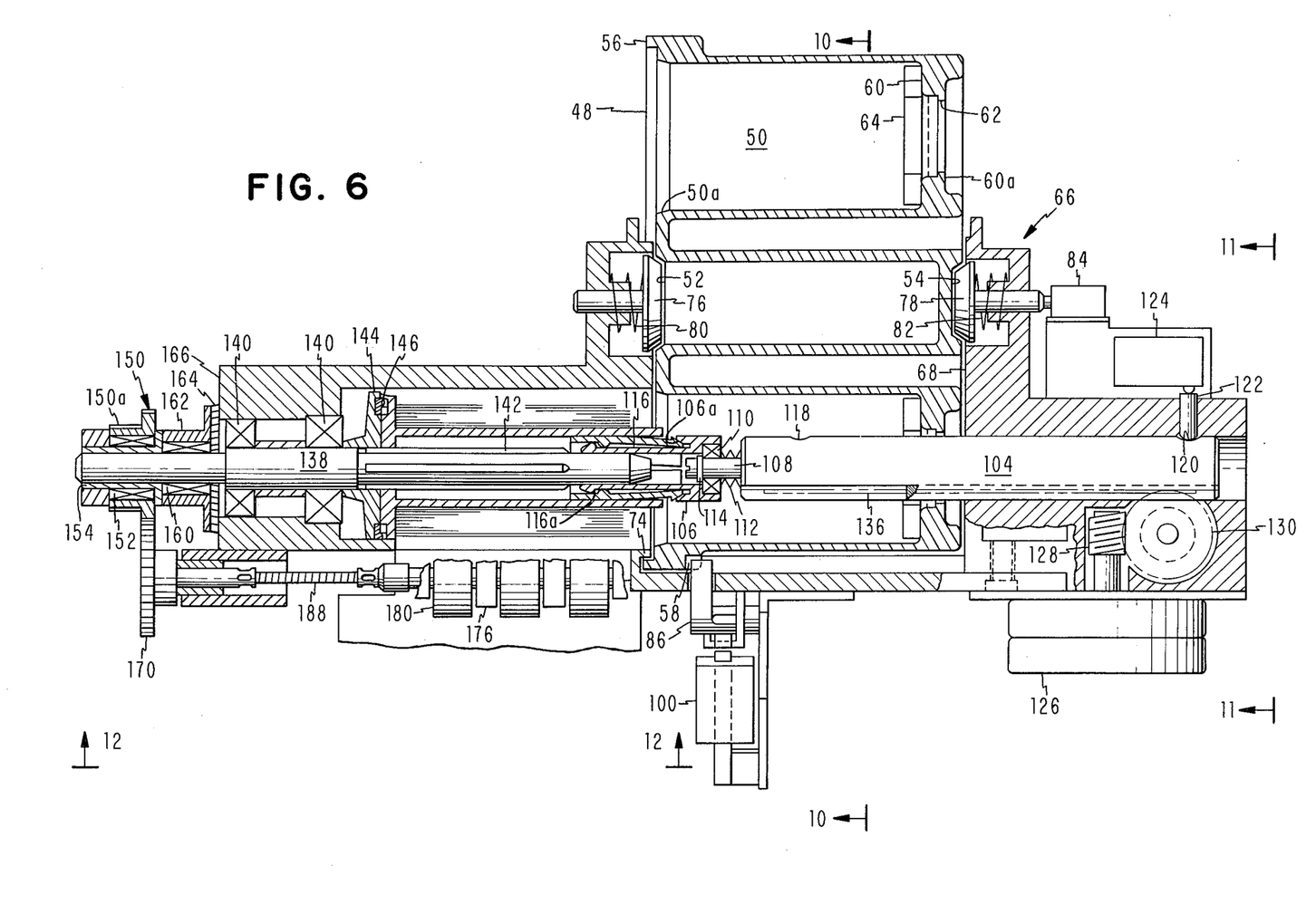
FIG. 6 is a fragmentary sectional view of the machine taken on a horizontal section plane with the carousel shown in FIG. 4 being positioned on the machine.

A plunger 104 is slideably disposed in the machine 66 and carries a latch 106 by means of a stud 108 fixed to the plunger 104 (see FIG. 6). The latch 106 is rotatably disposed on the stud 108 by means of a bearing 110 of the ball type. Belleville spring washers 112 hold the bearing 110 against a retaining washer 114 that is fixed on the end of the stud 108. The latch 106 is serrated longitudinally to have a plurality of fingers 116 each of which is somewhat pointed as shown in FIG. 6 and has a retaining surface 116a for purposes to be hereinafter described.

The plunger 104 has a pair of notches 118 and 120 in its periphery adapted to receive a plunger 122. A switch 124 is actuated by the plunger 122.

Figures 11, 12:
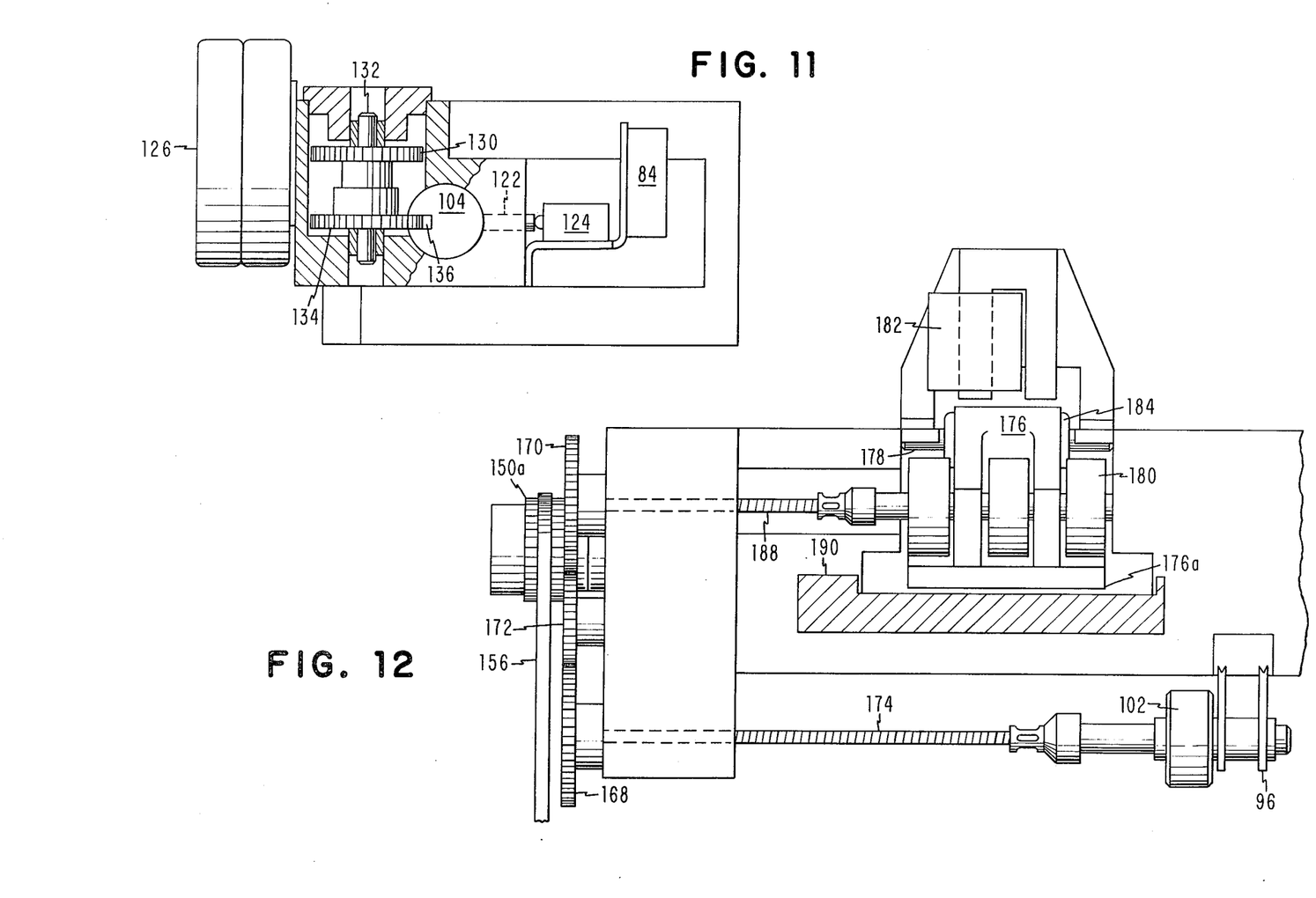
FIG. 11 is a sectional view on an enlarged scale taken on line 11—11 of FIG. 6.
FIG. 12 is a sectional view on an enlarged scale taken on line 12—12 of FIG. 6.

The plunger 104 is driven from an electric motor 126 mounted on the machine (see FIGS. 5 and 11). The motor 126 drives a worm gear 128 which is in mesh with a gear 130. The gear 130 is fixed on a shaft 132, and a second gear 134 is also fixed on the shaft 132 so that there is a driving connection from the gear 130 to the gear 134. A gear rack 136 is provided in the plunger 104, and gear 134 is in mesh with the rack 136.

A cartridge receiving shaft 138 is rotatably disposed in the machine by means of bearings 140, and the shaft 138 is provided with longitudinal splines 142. The splines 142 are so spaced that they may pass between the teeth 42 in a cartridge 30. An annular flange 144 is carried by the shaft 138, and a rubber washer 146 is positioned between the flange 36 of a cartridge 30 and the flange 144 is registering depressions provided in the flanges 36 and 144.

Figure 9:
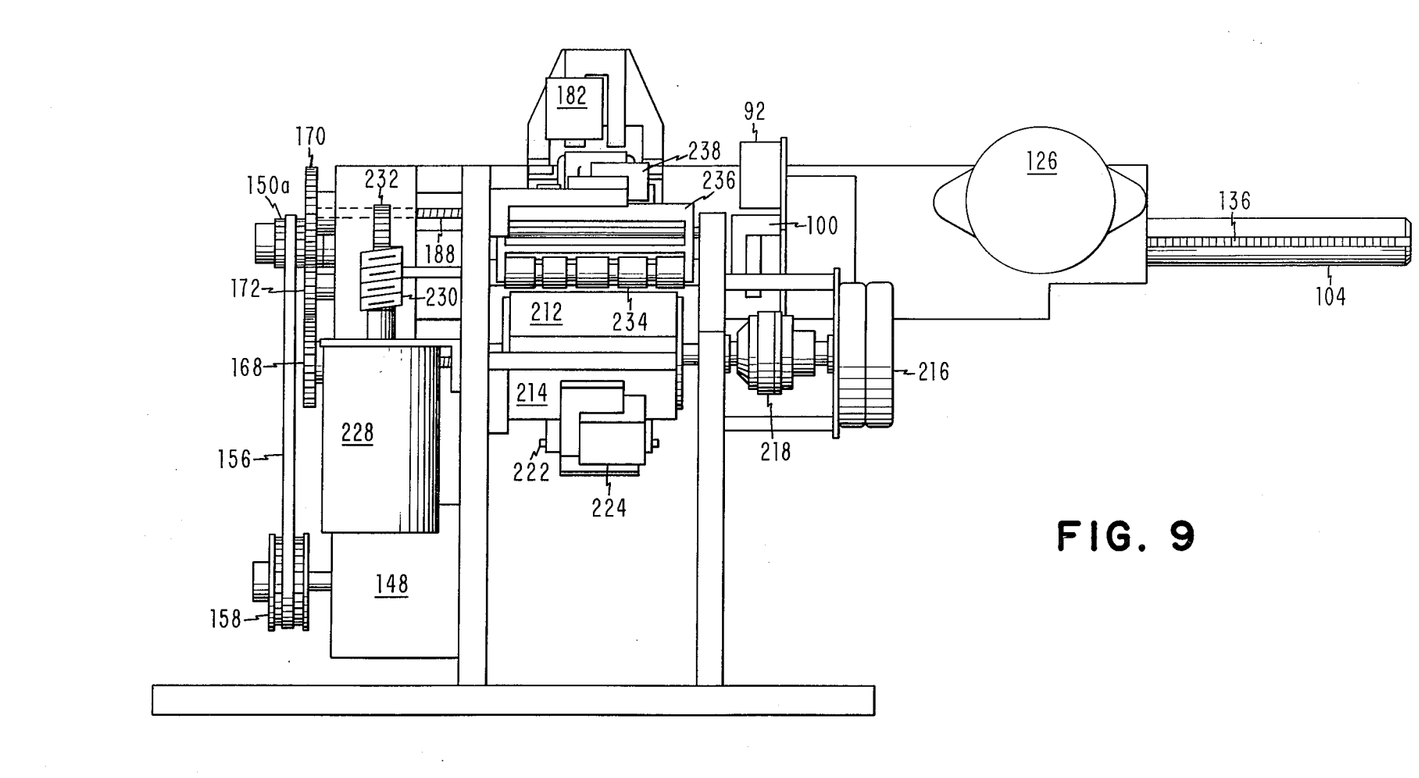
FIG. 9 is an end elevational view of the machine taken from line 9—9 of FIG. 5.

The shaft 138 is driven from a motor 148 (see FIG. 9). A gear 150 is mounted on the shaft 138 through a one-way bearing 152 and a sleeve 154. The gear 150 has a ribbed peripheral surface 150a, and an internally toothed belt 156 extends over the ribbed portion 150a and over a correspondingly ribbed output pulley 158 of the motor 148. The sleeve 154 is fixed with respect to the shaft 138, and the one-way bearing 152 is of such construction that when the gear 150 is driven from the motor 148, the shaft 138 is correspondingly driven.

A one-way bearing 160, which is of an opposite hand with respect to that of the bearing 152, is disposed on the shaft 138 and within an annular member 162. An annular pad 164 is disposed between the member 162 and a surface 166 of the machine for braking the shaft 138 at times as will be hereinafter mentioned.

Figure 8:
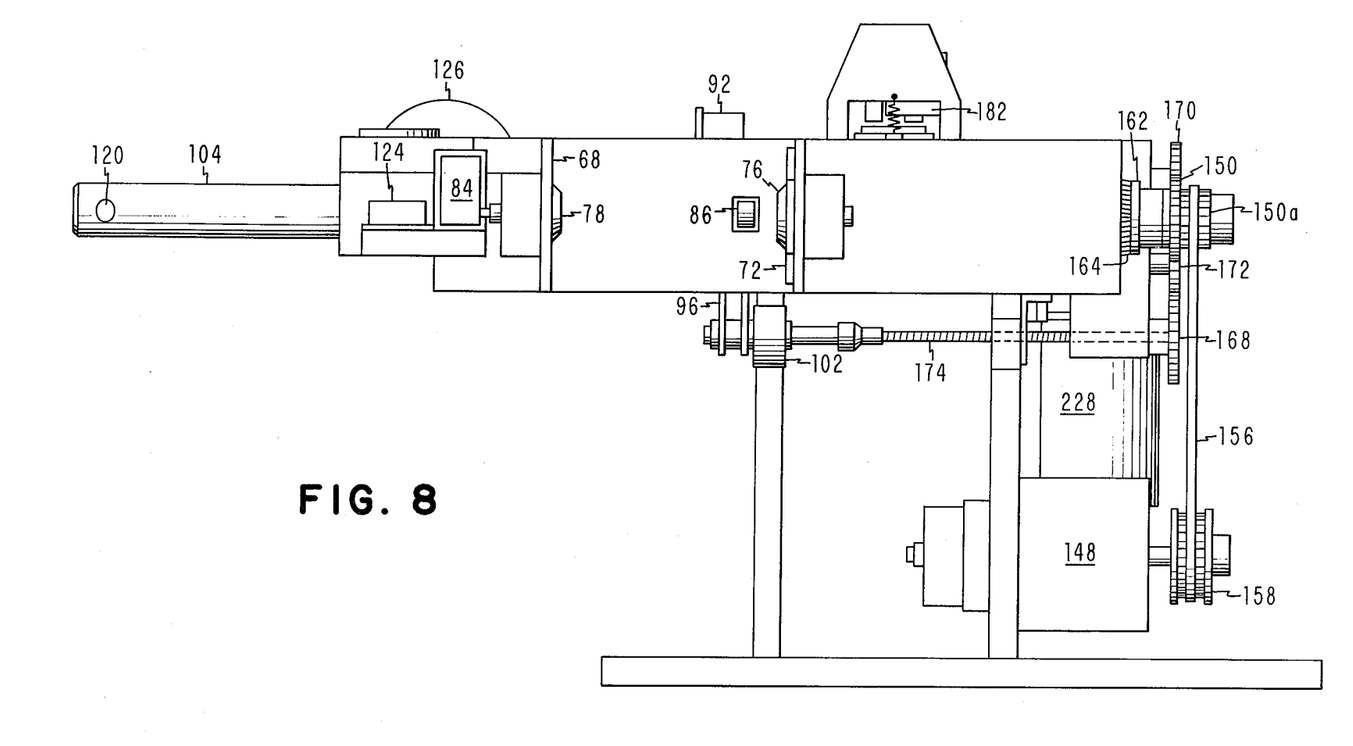
FIG. 8 is an end elevational view of the machine taken from line 8—8 of FIG. 5.

A gear 168 (see FIGS. 8 and 9) is driven from the gear 150 through a gear train including a gear 170 in mesh with the two gears 168 and 170. The gear 168 drives the roller 102 through a flexible shaft 174.

A peeler bar 176 (see FIGS. 5 and 13) for peeling the tapered end 34a of the magnetic tape 34 from the surface of a cartridge 30 is swingably mounted on a pivot shaft 178. The bar 176 has a relatively sharp tip 176a for tape peeling purposes, and a plurality of rolls 180 are carried by and are rotatably disposed within the bar 176. An electromagnet 182 is provided for swinging the bar 176 and has an armature 184 swingably disposed on the shaft 178. A rotary driving connection is provided between the armature 184 and bar 176 including a U-shaped spring 186 which is disposed in registering cavities provided in the armature 184 and bar 176. The rolls 180 are driven from the gear 170 by means of a flexible drive shaft 188 (see FIG. 6).

The machine is provided with a flat table 190 (see FIGS. 13 and 14) across which the tape 34 travels from the rolls 180, and a rotary magnetic read/write disk 192 is coextensive with the upper surface of the table 190. The read/write disk 192 is drivingly rotated from any suitable drive means (not shown) and has a pair of magnetic write heads 194 and a pair of magnetic read heads 196 spaced at 90° adjacent the outer edge of the disk 192.

A magnetic tape shield 198 extends from an end of the table 190 and overlies the table and has a rounded portion 198a extending downwardly into a circular cavity provided in the upper surface of the disk 192. A plate-like tape guide member 200 overlies and is spaced from the table 190, and an arcuate arm 202 is swingably disposed on the upper surface of the guide member 200 by means of a shaft 204 carrying the arm 202 (see FIGS. 7, 13 and 14). An arcuate opening 202a is provided in the member 200 through which the arm 202 pivots for acting on magnetic tape passing along the table 190 and over the shield 198 as will be hereinafter more fully described. An arm 206 is fixed on the shaft 204, and an electromagnet 208 actuates the arcuate arm 202 through the arm 206 and shaft 204. A spring 209 acts against the electromagnet 38 and swings the arm 202 downwardly.

A tape takeup spool 210 is rotatably disposed within shells 212 and 214 at the end of the table 190. The spool 210 is provided with a rubber covering 210a. A motor 216 (see FIG. 14) is provided for driving the spool 210 and is coupled with the spool 210 by means of a magnetic clutch 218. A pressure pad arm 220 (see FIG. 13) is pivoted on a shaft 222 in order to move toward the spool 210, and an electromagnet 224 is provided for swinging the arm 220 about the shaft 222.

Figure 7:
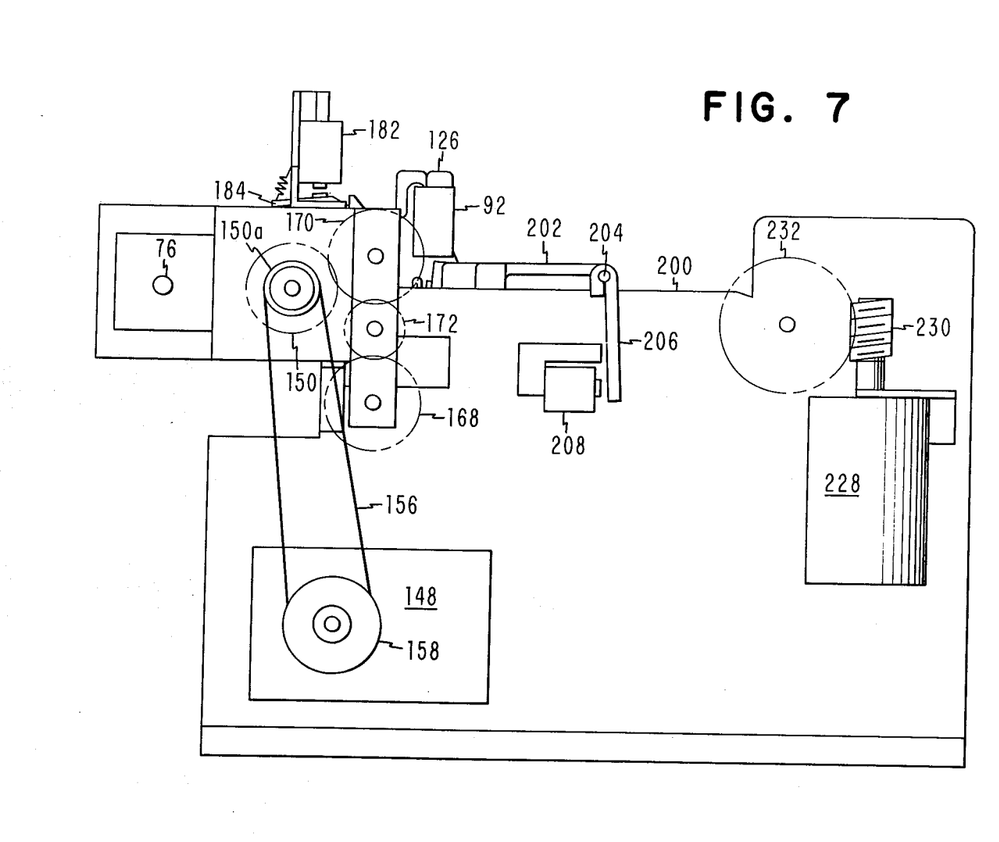
FIG. 7 is a side elevational view of the machine taken from line 7—7 of FIG. 5.

A mandrel or capstan 226 is disposed at the end of the table 190 and is driven from a motor 228 (see FIG. 7). The motor 228 is drivingly coupled with the mandrel 226 by means of a worm gear 230 on the output shaft of the motor 228 in mesh with a gear 232 having a direct drive connection with the mandrel 226. Pressure rolls 234 (see FIGS. 13 and 14) carried by a swing arm 236 are disposed at the side of the mandrel 226, and an electromagnet 238 is provided for actuating the arm 236 and moving the rolls 234 to have a nip with the mandrel 226. The shells 212 and 214 have a tape entrance slot 240 between them through which the tape moves from the table 190 onto the spool 210, and spring fingers 242 are carried by the guide member 200 and extend between the rolls 234 for guiding the magnetic tape into the shells 212 and 214 and into the vicinity of the spool 210.

In operation, six of the cartridges 30 each including a spool 32 and a length of magnetic tape 34 wound on the spool, are loaded into the carousel 48. A cartridge 30 is placed in each of the cavities 50 with the teeth 46 on the end of the cartridge 30 passing through and being compressed together due to the tapered tooth ends 46a by the radially extending flange 62 of the cavity 50. The insert 38 is of relatively flexible material to allow flexing of the teeth 46 inwardly as they are moved through the flange 62. When the cartridge 30 is completely within the cavity 50, the outwardly flaring portion 36a on the spool 32 engages with the outwardly flaring surface 50a of the cavity, and the radially extending surfaces 46b engage with the surface 60a of the portion 60 to hold the cartridge 30 within the cavity 50, the teeth 46 having again sprung outwardly due to the inherent resilience of the insert 38.

The carousel 48 is then mounted in the machine so that the plungers 76 and 78 snap into and engage with the tapered sides of the recesses 52 and 54 in the ends of the carousel 48. The carousel 48 can be moved into this engagement with the plungers 76 and 78 only in one rotative position which is determined by the slot 56a through which the key 72 passes as the carousel 48 is moved to engage with the plungers 76 and 78. Thus, a particular cavity 50 and the particular cartridge 30 within that cavity are initially in alignment with the plunger 104 and shaft 138. When the carousel 48 is thus moved into position in the machine, the plungers 76 and 78 move outwardly against their springs 80 and 82 to permit this insertion of the carousel into the machine; and, when the carousel 48 is in its proper position in the machine as illustrated in FIG. 6, the plungers 76 and 78 are still slightly out of their at-rest positions. The plunger 78 in this displaced position actuates the switch 84 which may be used to control any associated electronics for in turn controlling the various motors of the machine.

The carousel 48 is then drivingly rotated about the plungers 76 and 78 acting as axles to bring the desired cavity 50 and the desired cartridge 30 into alignment with the plunger 104 and shaft 138. This rotation of the carousel 48 is by the action of the roller 102. The motor 148 is in operation at the time, and it drives the roller 102 by means of the pulley 158, the belt 156, the gears 150, 170, and 168, and the flexible shaft 174. The roller 102 is moved into engagement with the carousel 48 by energizing the electromagnet 100 which rotates the lever 96 and the roller 102 in the counterclockwise direction as seen in FIG. 10 about the shaft 90 against the action of the spring 98. The carousel 48, in its initial position in the machine has the locking member 86 extending into one of the notches 58, and the rotation of the carousel 48 under the action of the roller 102 moves the locking member 86 to the left as seen in FIG. 10 out of the notch 58 against the action of the spring within the switch 92 which functions to normally hold the actuating arm 94 of the switch in its FIG. 10 position. The electromagnet 100 is maintained in energized condition until just prior to an alignment of the desired cavity 50 and desired cartridge 30 with the plunger 104 and shaft 138; and, at this time, the electromagnet 100 is de-energized. The spring 98 moves the roller 102 back to retracted position out of driving engagement with the carousel 48, and the locking member 86 moves into the notch 58 that corresponds with the desired cavity 50 and cartridge 30 to hold the carousel 48 locked in its desired rotative position with the desired cavity 50 and desired cartridge 30 being in alignment with the plunger 104 and shaft 138.

The cartridge 30 in this cavity 50 is then moved by the plunger 104 to interengage with the shaft 138. The shaft 138 is at this time rotating in the so-called reverse direction A (see FIGS. 10 and 13), being driven by the gear 150 through the one-way engaging device 152 and the collar 154. The plunger 104 initially is in its position in which the plunger 122 is within the notch 118, and the plunger 104 is moved to the left as seen in FIG. 6 under the action of the motor 126 driving through the gears 128, 130 and 134 and the rack 136. The latch 106 moves along with the plunger 104, and its fingers 116 move through the flange 62 and into the insert 38 of the spool 32 of the cartridge 30 which is alignment with the plunger 104 and shaft 138. The fingers 116 contact the rib 44 in the spool 32 and are moved inwardly by the rib 44 on continued movement of the latch 106 and fingers 116 along with the plunger 104, and the fingers 116 move behind the rib 44 (to the left of the rib 44 as seen in FIG. 6), with the finger surfaces 116a clamping around the rib 44. The fingers 116 are of flexible material to permit them to so move within and through the internal rib 44 of the cartridge 30. At about this time, the flaring surface 106a of the latch 106 contacts the tapered surfaces 46a of the teeth 46 and cam the teeth 46 inwardly so that, with continued movement of the plunger 104 to the left as seen in FIG. 6, the cartridge 30 is unlatched with respect to the return bent portion 60 of the carousel 48. On continued movement of the plunger 104, the cartridge 30 is moved along with the plunger 104 until finally the cartridge 30 is in its illustrated position in FIG. 6 with the flange 36 of the cartridge 30 in contact with the flange 144 fixed to the shaft 138. As the teeth 42 move to the position of the splines 142 on the shaft 138, the teeth 42 interengage with the splines 142; and the cartridge 30 then begins rotation in the reverse direction A along with the shaft 138. This is in a direction so that any contact of the end 34a of the tape 34 with the surrounding structure tends to wind the magnetic tape 34 more tightly onto the spool 32 of the cartridge 30. The plunger 104 has moved to the left to the position as seen in FIG. 6 in which the plunger 122 has entered the notch 120 in the plunger 104, so that the switch 124 is actuated. The motor 148 is stopped at this time, preferably under the action of the switch 124.

It will be noted that the latch 106 is in firm engagement with the right end of the cartridge 30 when the cartridge 30 is fully seated on the shaft 138, and the shaft 138 holds the fingers 116 in their FIG. 6 positions in which they clamp around the internal rib 44 of the spool 32. At this time, the bearing 110 functions to support the right end of the cartridge 30 as seen in FIG. 6 during its rotation by the shaft 138. The springs 112 compress to hold the cartridge 30 in its position fully seated on shaft 130 with the flange 146 in contact with the flange 144.

Figure 13:
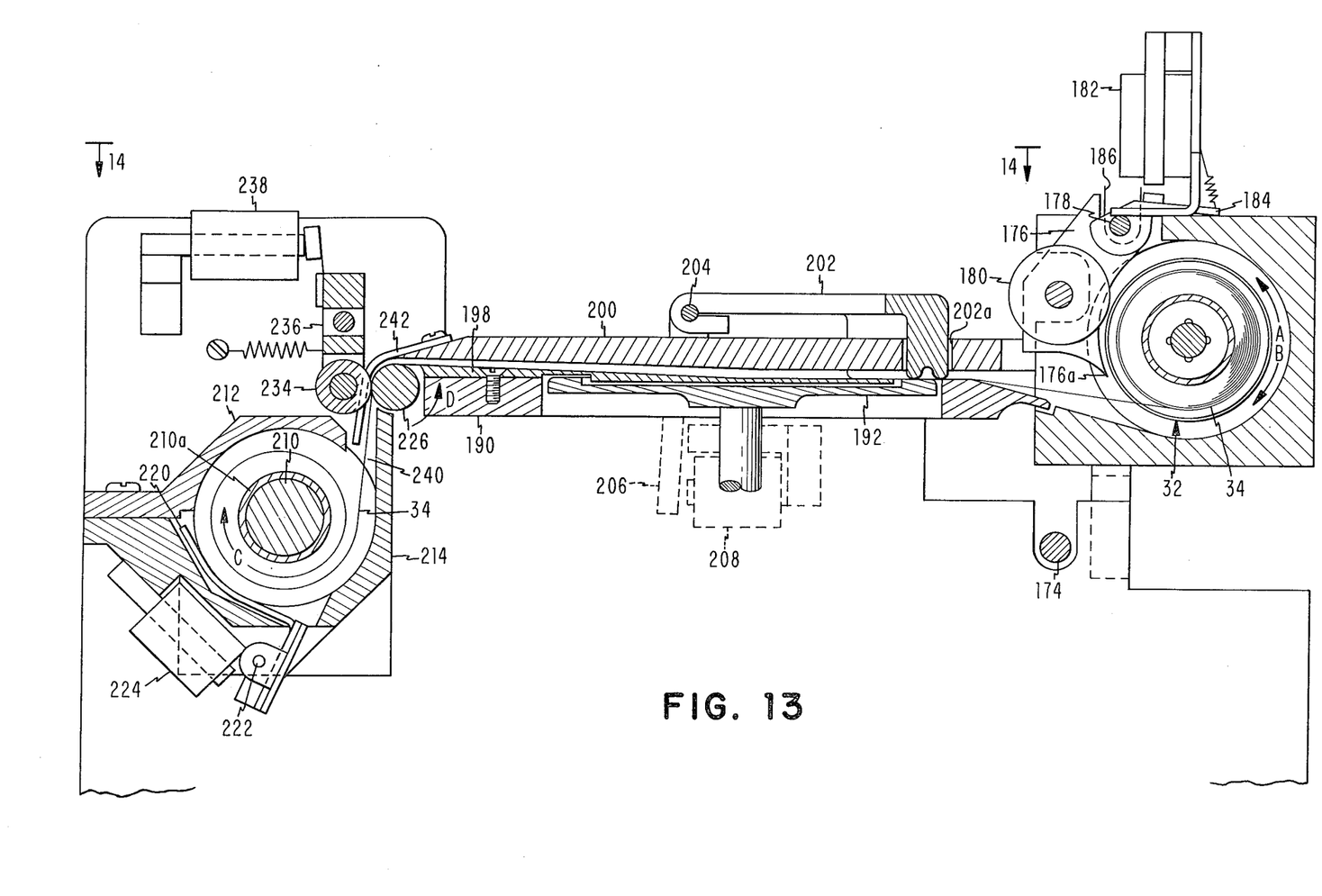
FIG. 13 is a sectional view taken on line 13—13 of FIG. 5.
Figure 14:
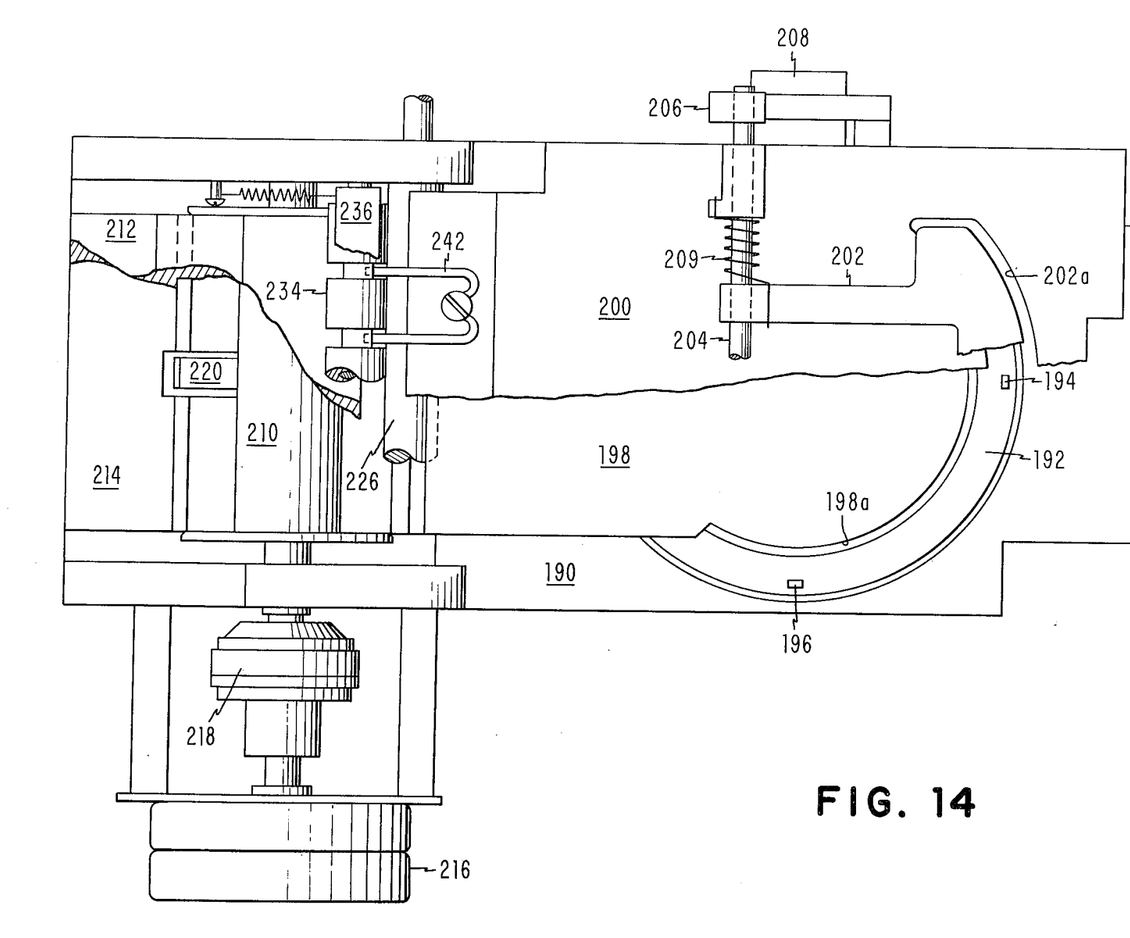
FIG. 14 is a sectional view taken on line 14—14 of FIG. 13.

At this time, the electromagnet 182 is energized to move the peeler bar 176 in the counterclockwise direction (see FIG. 13) to bring its sharpened tip 176 in close proximity with the exterior surface of the magnetic tape 34 on the spool 32 of the cartridge 30 and to bring the rolls 180 into engagement with the tape 34 on the spool 32. Also, at this time, the motor 148 is again energized but this time to drive in the opposite direction from its original direction of drive. The rolls 180 are driven from the motor 148 through the pulley 158, the gears 150, 170, 172 and 168, and the flexible shaft 188 (see FIG. 6); and the rolls drive the tape 34 as wound on the spool 32 in the forward direction B as seen in FIG. 13. The peeler bar 176 and particularly its sharpened end 176a, with this rotation of the cartridge 30, catches end end 34a of the tape 34 so that it moves across the bed 190 toward the mandrel 226 and takeup spool 210. The tape moves over the magnetic read/write disk 192 and the tape shield 198 and beneath the tape guide member 200. The arm 202 at this time is raised to provide no impedance to the movement of the tape.

The pressure rolls 234 at this time are raised with respect to the mandrel 226, and the forward end 34a of the tape 34 passes beneath the spring fingers 242 and through the slot 240 into a position within the shells 212 and 214 beneath the spool 210 and above the pressure pad arm 220. The spool 210 is driven in direction C (see FIG. 13) from the motor 216 through the magnetic clutch 218, and the electromagnet 224 is energized to rotate the arm 220 in the clockwise direction as seen in FIG. 13 about its pivot shaft 222. The arm 220 pinches the tape 34 between the rubber covering 210a of the spool 210 and the arm 220; and, due to the frictional difference between the rubber covering 210a of the spool 210 and the arm 220 and due to the fact that the curvature of the arm 220 closely matches the exterior curvature of the spool 210, the magnetic tape 34 cinches tightly around the spool 210 and is thus wound on the spool 210 as the motor 216 drives the spool 210 through the magnetic clutch 218. At this time, the electromagnet 224 is de-energized so that the arm 220 retracts to its position as shown in FIG. 13. The electromagnet 182 also is de-energized at this time so as to cause a retraction of the rolls 180 from the surface of the magnetic tape 34 on the spool 32, and the motor 148 may also be rendered inoperative at this time. The speed of the spool 210 as driven by the motor 216 through the magnetic clutch 218 may be such as to provide a relatively high slew speed to the tape 34 as it is being wound onto the spool 210, such as, for example, of 40 inches per second tape speed.

When the desired position in the tape 34 is reached, with the tape travelling at the relatively high slew speed, the electromagnet 238 is energized so as to move the pressure rolls 234 to have a pressure nip with the mandrel 226. The mandrel 226 is driven in direction D by the motor 228 through the gears 230 and 232 to move the tape 34 across the bed 190 toward the spool 210, and the speed of the mandrel 226 is such that the tape 234 is driven at a relatively slow processing speed, such as 1.2 inches per second. The electromagnet 208 is energized at this time, and it moves the arm 202 downwardly so as to hold the tape 34 in close proximity to the heads 194 and 196. The heads 194 and 196 may then be effective to either write information on the tape 34 magnetically or to read such information magnetically from the tape. The motor 216 is still effective to drive the takeup spool 210; however, the magnetic clutch 218 slips so that the peripheral speed of the spool 210 is the relatively low tape processing speed. The one-way bearing 160, the annular member 162 and the annular pad 164 disposed between the member 162 and the surface 166 of the machine operate as a friction brake for braking the shaft 138 and the tape spool 32 to prevent overrun of the spool 32 when the speed of the tape 30 in traversing the bed 190 is suddenly decreased from slew speed to processing speed.

When the magnetic reading and writing action has ceased, the motor 216 and the electromagnet 238 are de-energized and the motor 148 is energized to drive in its original, reverse direction. The shaft 138 and the cartridge spool 32 are then driven in the reverse direction A by means of the pulley 158, the gear 150, the one-way bearing 152 and the sleeve 154; and the magnetic tape 34 is drawn off of the spool 210 and is rewound on the cartridge spool 32.

After the tape 34 has been completely rewound onto the cartridge spool 32, the plunger 104 is moved to the right as seen in FIG. 6 to return the cartridge 30 into its cavity 50 within the carousel 48. This movement of the plunger 104 is due to the driving action of the motor 126, utilizing the gears 128, 130 and 134, and the rack 136. The fingers 116 extend around the internal rib 44 in the insert 38 of the cartridge 30, and the finger surfaces 116a contact the rib 44 and are held from moving out of contact with the rib by means of the end of the shaft 138 within the fingers 116; and, when the plunger 104 moves to the right as seen in FIG. 6, the plunger 104 draws the cartridge 30 off of the shaft 138. Eventually, the fingers 116 draw the cartridge 30 to the right as seen in FIG. 6 through such a distance that the teeth 46 pass through the flange 62. The teeth 46 bend inwardly to allow such passage, and then the teeth snap outwardly so that the tooth surfaces 46b again extend around the flange 62 and into contact with the surfaces 60a to again fasten the cartridge 30 within its cavity 50 of the carousel 48. The plunger 104 continues its movement until the fingers 116 are out of alignment with any of the parts of the carousel 48 and cartridge 30, and at this time the plunger 104 is in such position that the plunger 122 enters the notch 118 of the plunger 104. The switch 124 is again actuated so as to signal to any associated electronics that the carousel may again be rotated to bring another desired cartridge 30 into alignment with the plunger 104 and shaft 138 for processing of this particular cartridge 30.

When it is desired to remove the carousel 48 from the machine, it must be moved back into its original rotative disposition in which it was originally inserted into the machine so that the edges of the slot 56a travel around the key 72. The flange 74 overlying the flange 56 of the carousel 48 in other rotary positions of the carousel prevent the carousel 48 from being removed from the machine in other rotative dispositions. It is therefore easy to retain a count of the particular cartridge 30 that is in alignment with the plunger 104 and shaft 138 in processing position.

Advantageously, the machine utilizing the carousel 48 may be used as a magnetic tape digital recorder, more particularly as a library storage device. Each of the cartridges 30 may have a large data capacity, such as of 35 megabytes to that the total capacity of the machine using six cartridges 30 may be 210 megabytes. The tape 34 may, for example, be 2.7 inches wide and may have a useable length of 660 inches. Advantageously, any one of the six cartridges 30 can be program selected and may be automatically loaded and threaded as above described with the oxide side of the tape 34 in contact with the bed 190. The carousel 48 can be inserted into the machine in only one direction due to the action of the key 72, identifying a rotational home position and enabling cartridge selection under program control. Substitute carousels 48 can obviously be used in lieu of the illustrated carousel 48, and the carousel 48 can be designed with more than six of the cavities 50 to take more than six cartridges 30. Advantageously, the carousel 48 serves as a dust and contaminants protector for the tape 34.

The described machine advantageously provides both automatic loading and threading of the magnetic tape 34, and the machine advantageously ejects a cartridge from the carousel 48 and injects it into a threading chamber in which it is shown in FIG. 6. The arc shaped arm 202 controls the height of the tape 34 to attain the proper head to tape contact for magnetic writing and reading. The motor 228 is preferably of a variable speed hysteresis synchronous type and drives through the worm gear 230-spur gear 232 reduction to provide a smooth velocity to the tape 34 during reading and writing actions on the tape.

We claim:

1. A machine for operating on magnetic tape and including a cassette in the form of a carousel for holding a plurality of tape cartridges, each of said cartridges including a spool on which a length of tape is wound and said cassette being formed with a series of cavities each of which receives one of said cartridges to hole its spool with its axis substantially parallel with the major axis of said cassette, means for rotatively mounting said cassette so that it may rotate about its major axis, a plunger and a cartridge spool receiving shaft coaxially mounted with respect to each other and with respect to the spool of a cartridge in one of said cavities depending upon the rotative position of said cassette, means on the end of said plunger for moving into said last named cavity and for mechanically engaging with the spool of the cartridge in this cavity, means for reciprocably driving said plunger so that said plunger moves said cartridge onto said shaft and subsequently moves said cartridge back off of said shaft into the cavity for the cartridge after processing of the tape of the cartridge, means defining a path for said tape when it leaves a cartridge on said shaft, a takeup spool at the end of said path for winding up the tape as it moves along said path from its cartridge on said shaft, a magnetic head in said path for transferring information with respect to said tape as it moves along said path, means for driving said cartridge spool receiving shaft first in a reverse direction tending to wind up the tape onto the spool of the cartridge on said shaft, and means for subsequently driving the tape of the cartridge on said shaft in the opposite or forward direction to unwind the tape and move it along said path, said last named driving means including a tape contacting roller carried by a swing lever and means for driving said roller and means for moving said lever toward the tape of the cartridge on said shaft, said lever being provided with a relatively sharp tape peeling end for peeling the end of the tape of the cartridge on said shaft off of the remainder of the tape as wound on the spool of this cartridge.

2. A machine for operating on magnetic tape and including a cassette in the form of a carousel for holding a plurality of tape cartridges, each of said cartridges including a spool on which a length of tape is wound and said cassette being formed with a series of cavities each of which receives one of said cartridges to hold its spool with its axis substantially parallel with the major axis of said cassette, means for rotatively mounting said cassette so that it may rotate about its major axis, a plunger and a cartridge spool receiving shaft coaxially mounted with respect to each other and with respect to the spool of a cartridge in one of said cavities depending upon the rotative position of said cassette, means on the end of said plunger for moving into said last named cavity and for mechanically engaging with the spool of the cartridge in this cavity, means for reciprocably driving said plunger so that said plunger moves said cartridge onto said shaft and subsequently moves said cartridge back off of said shaft into the cavity for the cartridge after processing of the tape of the cartridge, means defining a path for said tape when it leaves a cartridge on said shaft, a takeup spool at the end of said path for winding up the tape as it moves along said path from its cartridge on said shaft, a magnetic head in said path for transferring information with respect to said tape as it moves along said path, means for initially driving said takeup spool at a relatively fast peripheral speed for providing a relatively fast slew speed of the tape in said path, and means for subsequently propelling said tape along said path at a relatively slow speed at which said magnetic head may be effective and including a mandrel, means for driving said mandrel at a relatively slow peripheral speed, a pressure roll adapted to have a pressure nip with said mandrel through which the tape passes to said takeup spool and means for moving said pressure roll toward and away from said mandrel to provide said nip or to release said tape.

3. A machine as set forth in claim 2 and including a magnetic clutch in series with said takeup spool for slipping when said mandrel and pressure roll are effective for driving the tape at said relatively slow speed along said path.

4. A machine for operating on magnetic tape and including
- a cassette in the form of a carousel for holding a plurality of tape cartridges, each of said cartridges including a spool on which a length of tape is wound and said cassette being formed with a series of cavities each of which receives one of said cartridges to hold its spool with its axis substantially parallel with the major axis of said cassette,
- means for rotatively mounting said cassette so that it may rotate about its major axis,
- a plunger and a cartridge spool receiving shaft coaxially mounted with respect to each other and with respect to the spool of a cartridge in one of said cavities depending upon the rotative position of said cassette,
- means on the end of said plunger for moving into said last named cavity and for mechanically engaging with the spool of the cartridge in this cavity,
- means for reciprocably driving said plunger so that said plunger moves said cartridge onto said shaft and subsequently moves said cartridge back off of said shaft into the cavity for the cartridge after processing of the tape of the cartridge,
- means defining a path for said tape when it leaves a cartridge on said shaft,
- a takeup spool at the end of said path for winding up the tape as it moves along said path from its cartridge on said shaft, and
- a magnetic head in said path for transferring information with respect to said tape as it moves along said path,
- said means on the end of said plunger for mechanically engaging with the spool of the cartridge within a said cavity in alignment with said plunger including a pair of opposed hooklike fingers on said end of the plunger which move into the spool of the cartridge within said cavity in alignment with said plunger and hook over an inwardly extending rib formed within said spool so as to mechanically connect the plunger with the spool.

5. A machine for operating on magnetic tape and including
- a cassette in the form of a carousel for holding a plurality of tape cartridges, each of said cartridges including a spool on which a length of tape is wound and said cassette being formed with a series of cavities each of which receives one of said cartridges to hold its spool with its axis substantially parallel with the major axis of said cassette,
- means for rotatively mounting said cassette so that it may rotate about its major axis,
- a plunger and a cartridge spool receiving shaft coaxially mounted with respect to each other and with respect to the spool of a cartridge in one of said cavities depending upon the rotative position of said cassette,
- means on the end of said plunger for moving into said last named cavity and for mechanically engaging with the spool of the cartridge in this cavity,
- means for reciprocably driving said plunger so that said plunger moves said cartridge onto said shaft and subsequently moves said cartridge back off of said shaft into the cavity for the cartridge after processing of the tape of the cartridge,
- means defining a path for said tape when it leaves a cartridge on said shaft,
- a takeup spool at the end of said path for winding up the tape as it moves along said path from its cartridge on said shaft,
- a magnetic head in said path for transferring information with respect to said tape as it moves along said path,
- driving means for drivingly rotating said cassette about its major axis, and
- means coupled with said last named driving means for detentably holding said cassette in registered positions in which said cavities are selectably in alignment with said plunger and said cartridge spool receiving shaft.

6. A machine for operating on magnetic tape and including
- a cassette in the form of a carousel for holding a plurality of tape cartridges, each of said cartridges including a spool on which a length of tape is wound and said cassette being formed with a series of cavities each of which receives one of said cartridges to hold its spool with its axis substantially parallel with the major axis of said cassette,
- means for rotatively mounting said cassette so that it may rotate about its major axis,
- a plunger and a cartridge spool receiving shaft coaxially mounted with respect to each other and with respect to the spool of a cartridge in one of said cavities depending upon the rotative position of said cassette,
- means on the end of said plunger for moving into said last named cavity and for mechanically engaging with the spool of the cartridge in this cavity,
- means for reciprocably driving said plunger so that said plunger moves said cartridge onto said shaft and subsequently moves said cartridge back off of said shaft into the cavity for the cartridge after processing of the tape of the cartridge,
- means defining a path for said tape when it leaves a cartridge on said shaft,
- a takeup spool at the end of said path for winding up the tape as it moves along said path from its cartridge on said shaft,
- a magnetic head in said path for transferring information with respect to said tape as it moves along said path,
- motor means for driving said takeup spool,
- a pressure pad arm pivotally mounted opposite and adjacent to said takeup spool, and
- motor means for rotatably swinging said pressure pad arm so as to bring it into contact with the periphery of said takeup spool,
- said takeup spool having a yieldable outer surface so that when the tape is moved between said pressure pad arm and takeup spool the takeup spool starts the winding of the tape onto the takeup spool.

* * * * *